(12) United States Patent
Chung et al.

(10) Patent No.: US 6,356,320 B1
(45) Date of Patent: Mar. 12, 2002

(54) LCD WITH TFT ARRAY HAVING WAVE-SHAPED RESISTANCE PATTERN TO CORRECT STITCHING DEFECT

(75) Inventors: In Jae Chung; Kyo Seop Choo, both of Kumi-shi (KR)

(73) Assignee: LG. Philips LCD Co., Ltd., Seoul (KR)

(*) Notice: Subject to any disclaimer, the term of this patent is extended or adjusted under 35 U.S.C. 154(b) by 0 days.

(21) Appl. No.: 09/432,522

(22) Filed: Nov. 3, 1999

(51) Int. Cl.⁷ .................................... G02F 1/1333
(52) U.S. Cl. ............................. 349/54; 349/192
(58) Field of Search ..................... 349/54, 192, 148, 349/139, 55

(56) References Cited

U.S. PATENT DOCUMENTS

| | | | | |
|---|---|---|---|---|
| 5,026,143 A | * | 6/1991 | Tanaka et al. | 350/336 |
| 5,656,526 A | * | 8/1997 | Inada et al. | 430/314 |
| 5,714,770 A | * | 2/1998 | Kim | 257/59 |
| 6,088,073 A | * | 7/2000 | Hioki et al. | 349/40 |

FOREIGN PATENT DOCUMENTS

JP       10153791       6/1998

* cited by examiner

Primary Examiner—Toan Ton
Assistant Examiner—Andrew Schechter

(57) ABSTRACT

A large size liquid crystal display apparatus is manufactured using a divided exposure method in which stitching defects are eliminated. In the method of forming such a liquid crystal display, a stitching defect correcting element is defined at an end of a gate bus line or a data bus line in which a matrix pattern of gate lines and data lines are formed using the divided exposure method. A TFT array substrate includes the stitching defect correcting element such that stitching defects are eliminated by forming a wave shaped resistance pattern and using a laser to shape or cut the stitching defect correcting element which is connected to the data bus line or the gate bus line so as to eliminate stitching defects which occur due to the difference in pattern width of the data bus line or the gate bus line located at the border of the dividing exposure line.

32 Claims, 5 Drawing Sheets

LCD WITH TFT ARRAY HAVING WAVE-SHAPED RESISTANCE PATTERN TO CORRECT STITCHING DEFECT

Background Of The Invention

1. Field of the Invention

The present invention relates to a liquid crystal display ("LCD") apparatus and a method of manufacturing thereof, and more specifically, to a method of manufacturing and structure of an LCD apparatus which eliminates stitching defects caused by an irregularity in a width of a gate line or data line.

2. Description of the Background Art

In general, a liquid crystal display device includes a TFT array substrate. In the structure of the TFT array substrate as shown in FIGS. 1 and 2, a plurality of gate bus lines 60 are arranged horizontally and are spaced from each other by a certain distance. A plurality of data bus lines 70 are arranged vertically and are spaced from each other by a certain distance. The gate bus lines 60 and the data bus lines 70 are arranged so that the data bus lines 70 and the gate bus lines 60 intersect each other so as to define a matrix array.

A gate pad 60a and a data pad 70a which are in contact with a drive IC are defined at the end of the gate bus line 60 and the data bus line 70. A pixel electrode 40 is defined in each block area defined by the intersections of the gate bus line 60 and the data bus line 70 and a TFT 50 is also defined at the intersection point of the gate bus line 60 and the data bus line 70.

The TFT 50 includes a gate electrode 60b which is made from material used to form the gate bus line 60, a source electrode 70b and a drain electrode 70c which are made from a material used to form the data bus line 70, and a semiconductor layer 90. The drain electrode 70c of the TFT is in contact with the pixel electrode 40.

A display device that is manufactured by simultaneously defining a gate bus line and a data bus line is suitable when forming a large LCD with the above-mentioned structure, which has more than a 14 or 15 inch display area. However, due to technical limitations in manufacturing such a display device, the size of an area that can be exposed at one time is limited. For example, for large panels, a one-shot exposing process cannot be used since the panel is too large for conventional exposing equipment.

Therefore, in order to expose a large substrate, a divided exposure method is used. In the divided exposure method, a first portion of a substrate is exposed first and then a second, remaining part of the substrate is exposed. However, using the divided exposure method results in a difference in line width at a boundary line between the first area exposed by the first exposing step and the second area exposed by the second exposure step. Note that this difference in line width causes a difference in the resistance in the lines, which causes differences in luminance in the display. This luminance difference is called a stitching defect.

As shown in FIG. 3a, a metal layer 55 in which a desired pattern is to be defined is disposed on a transparent substrate 10 using the divided exposure method. In order to perform the divided exposure method on a large substrate 11 which is covered with a photo resist layer 80, the area of the photo resist layer is divided into part A and part B. An exposure mask 100, which exposes part A of the photo resist layer 80 and a border line D that divides parts A and B are located in the same position. The exposure mask 100 includes an exposure pattern 150 which is used to patter part A of the photo resist layer [of part A] of the substrate 11 into a certain pattern and a light blocking member 140. A light such as a UV ray which radiates from an exposure device on the exposure mask 100 penetrates the exposure pattern 150 and exposes the photo resist of part A of the substrate 11 with a certain pattern.

Then, an exposure mask 200 is located to be aligned with the border line D in order to expose part B of the photo resist layer 80 after eliminating the prior exposure mask 100 as shown in FIG. 3b. The exposure mask 200 includes an exposure pattern 151 and a light blocking member 141 in order to exposure part B of the photo resist layer 80 of the substrate 11. A light such as a UV ray which radiates from an exposure device on the exposure mask 200 penetrates the exposure pattern 151 and exposes the photo resist of part B of the substrate 11 with a certain pattern so at the end parts A and B which are divided by the border line D of the exposure mask are exposed into a certain pattern.

After exposing the photo resist into a certain pattern using each exposure mask 100 and 200, the photo resist layer 80 is developed and while using the developed photo resist pattern layer as a mask, a lower metal layer 55 is etched to define a data bus line 70 and a drain electrode 70c having a structure as shown in FIG. 4. A width (a) of a line such as the data bus line 70, which is located at the border part D of the divided exposure, is formed differently from widths (b) and (c) of the data bus lines 70 that are directly adjacent to the dividing line D as shown in FIGS. 4 and 5. The reason for the difference in the width pattern of the line formed at the border part of the divided exposure is because a metal layer is etched along the pattern of the photo resist. In other words, when resetting and attempting to locate the exposure mask 200 at an identical position after partly exposing the photo resist with the exposure mask 100, the rest of the photo resist is exposed in a state in which the location of the pattern of the exposure mask is slightly out of place or misaligned due to an error in positioning of the mask and the metal layer is etched according to such a pattern of the photo resist.

The patterned width (a) of the data bus line 70 at the border part D of the divided exposure is wider than the widths (b) and (c) of the data bus lines 70 which are directly adjacent to the dividing line D if the exposure mask 200 is placed to the right of line D as shown in FIG. 4. On the other hand, the patterned width (a) of the data bus line 70 at the border part D of the divided exposure is narrower than the widths (b) and (c) of the data bus lines 70 that are directly adjacent to the dividing line D if the exposure mask 200 is placed to the left of line D as shown in FIG. 5.

The substrate 11 of an LCD apparatus includes the pixel electrode 40 in contact with the drain electrode 70c. The TFT is formed such that the data bus line 70 is formed in the above described manner. When the screen of an LCD apparatus including each one of the pixel electrodes 40 is checked by applying power to the data pad 70a at an end of the data bus line 70 and the gate pad 60a at an end of the gate bus line 60, the problem of the stitching defect is determined at the border part D of the divided exposure.

The stitching defect is identified by a difference in the resistance value of each line and this difference in resistance is due to the fact that the width (a) of the data bus line 70 at the border part D of the divided exposure is different from the widths (b) and (c) of the data bus lines 70 that are directly adjacent to the dividing line D. Therefore, when using the divided exposure method for making a large substrate, the occurrence of the stitching defect still cannot be avoided even though there is some improvement in the degree of occurrence compared to suing an exposure method which exposes a substrate using a one-shot exposure process.

SUMMARY OF THE INVENTION

Preferred embodiments of the present invention overcome the problems of the conventional art described above by correcting the stitching defect which occurs at the border area of the divided exposure when the gate bus line and the data bus line are patterned using conventional divided exposure methods.

In a preferred embodiment of the present invention, a liquid crystal display includes a substrate, a plurality of gate lines disposed on the substrate, a plurality of data lines disposed on the substrate and arranged to define a matrix pattern with the plurality of gate lines, a plurality of thin film transistors connected to the gate lines and data lines, and a plurality of pixel electrodes connected to the thin film transistors, wherein a stitching defect correction element is included in at least one of the plurality of data lines.

In another preferred embodiment of the present invention, a method of a manufacturing liquid crystal display device includes the steps of forming a TFT array substrate in which a stitching defect correcting element is formed in between at least one of a plurality of data bus line and a data pad, and forming a wave shaped pattern with a width narrower than that of the data bus line at a selected stitching defect correcting element.

These and other features, elements, characteristics and advantages of the present invention will become apparent from the detailed description of preferred embodiments of the present invention below with reference to the attached drawings.

BRIEF DESCRIPTION OF THE ATTACHED DRAWINGS

Figure 1:
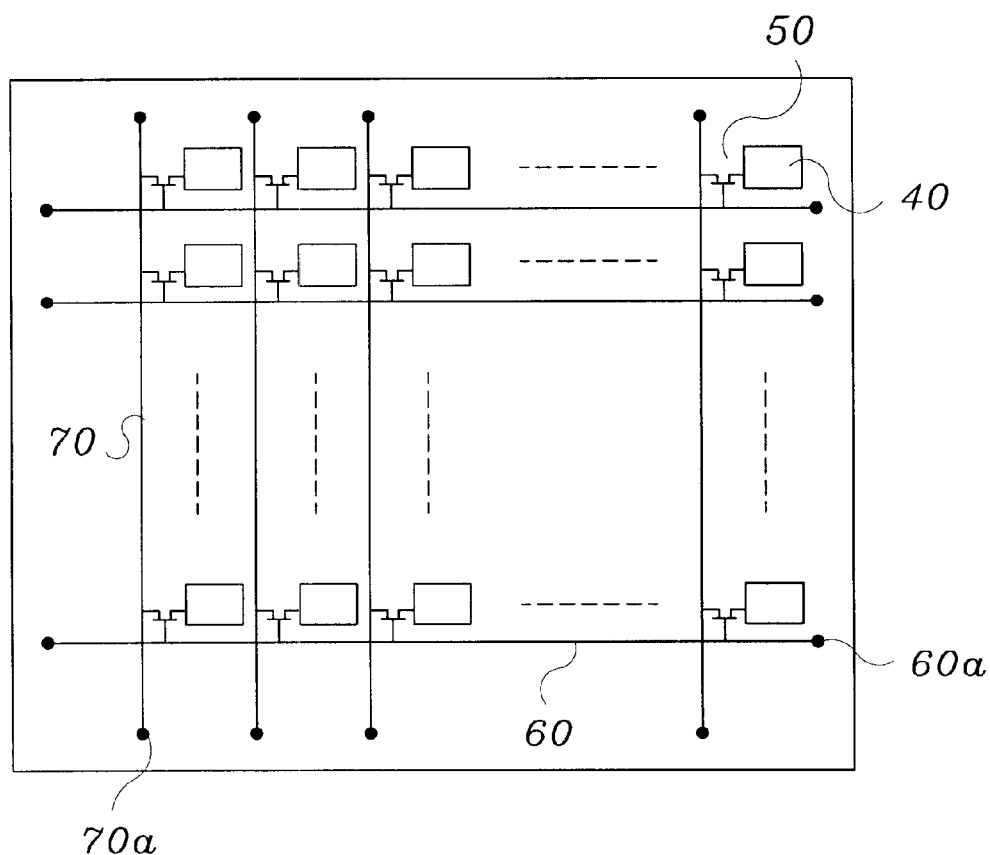
FIG. 1 is a plane view of a conventional LCD apparatus.
Figure 2:
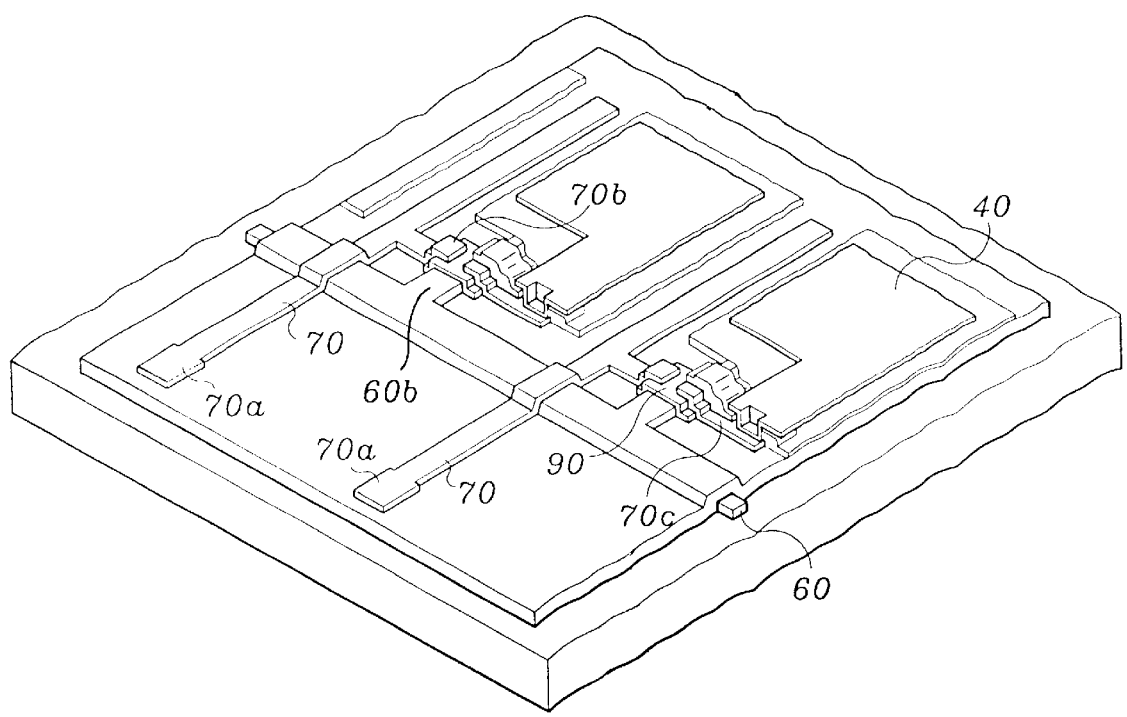
FIG. 2 is a perspective view illustrating a portion of the LCD apparatus of FIG. 1.
Figure 3A:
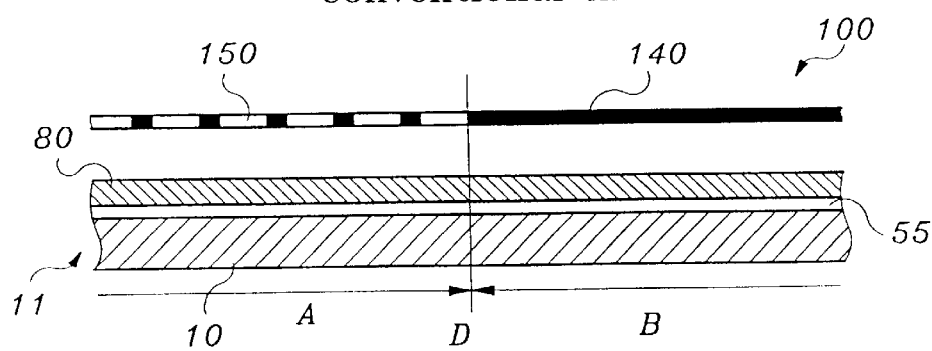
FIGS. 3a and 3d are cross-sectional views showing the process of line patterning of a substrate of an LCD apparatus using a divided exposure process.
Figure 3B:
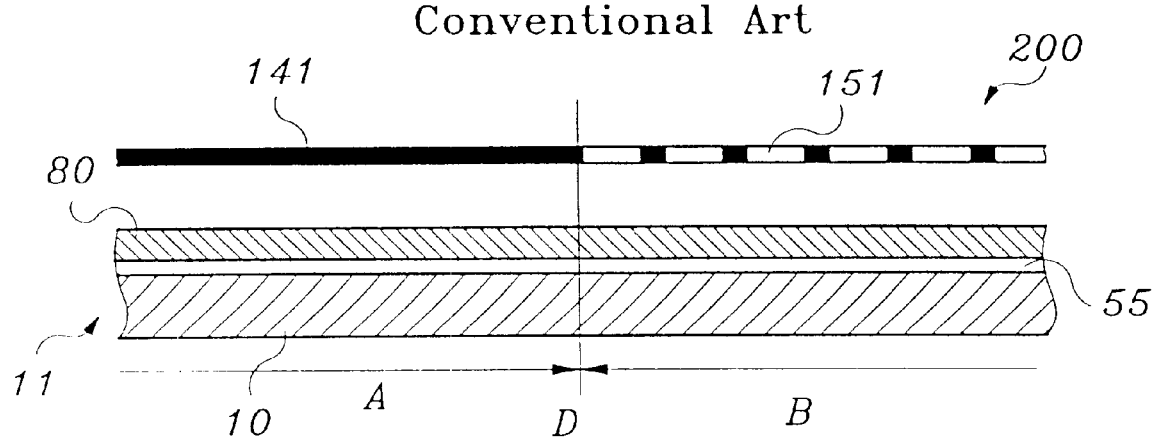
Figure 4:
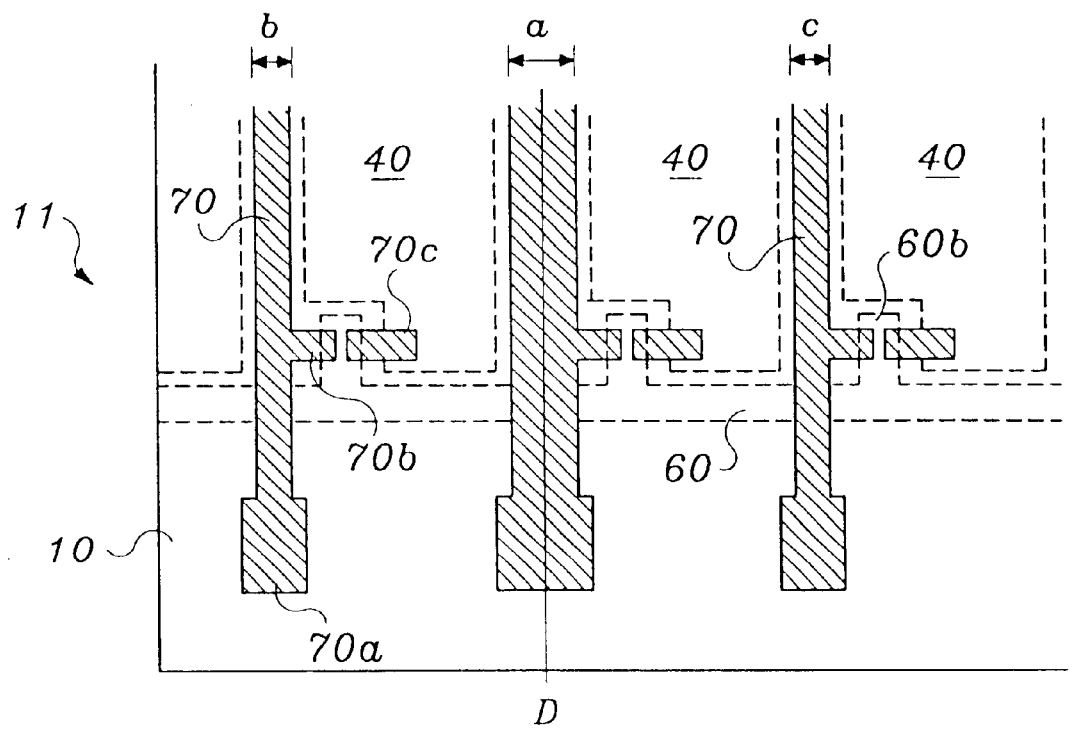
Figure 5:
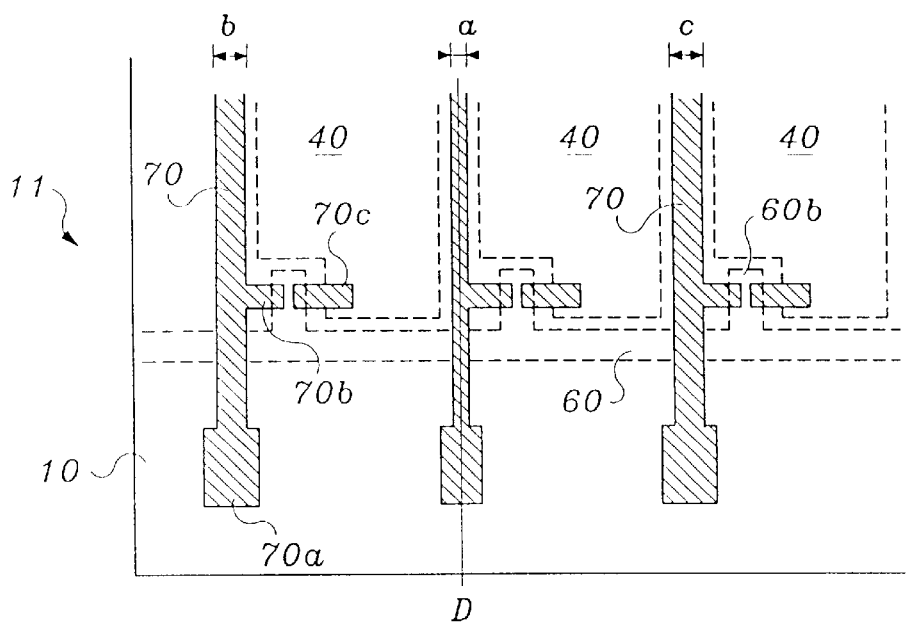
Figure 6:
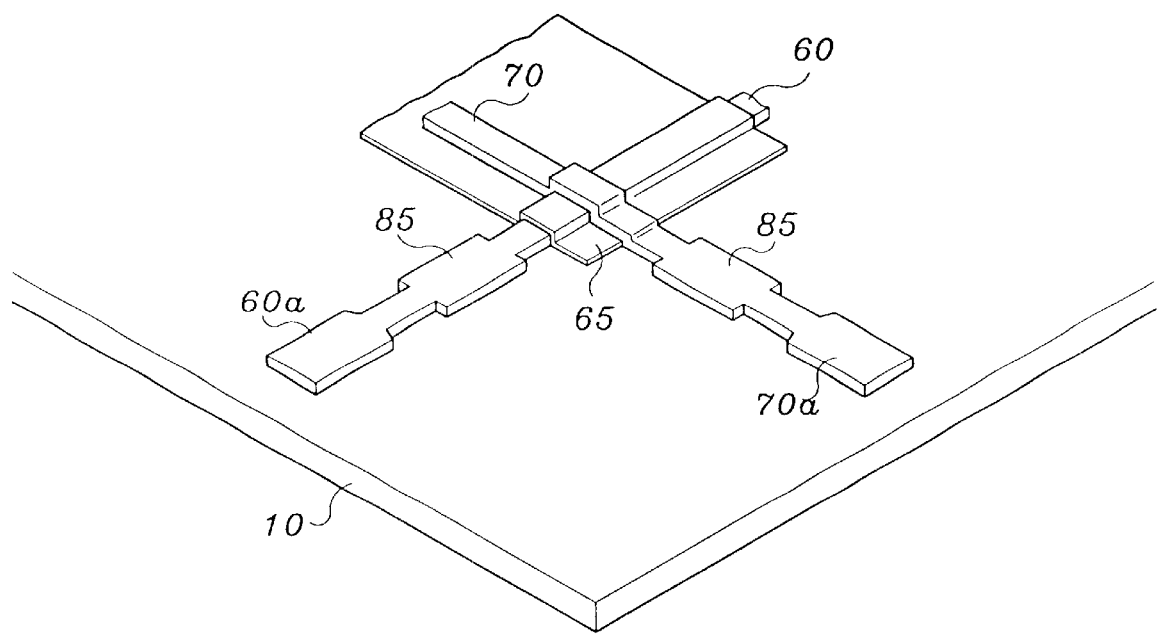
Figure 7:
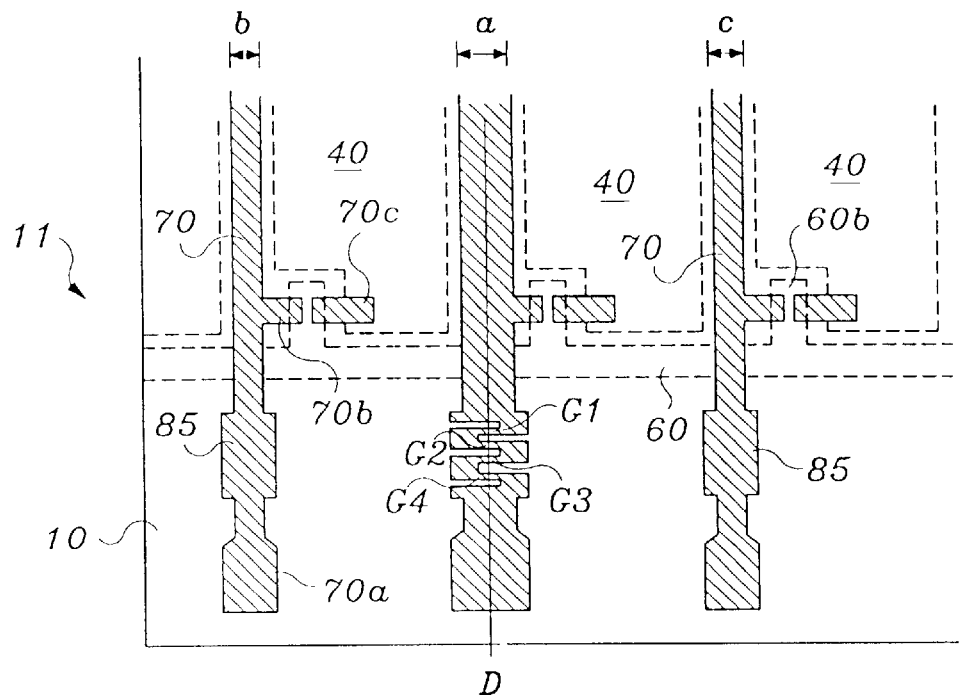
Figure 8:
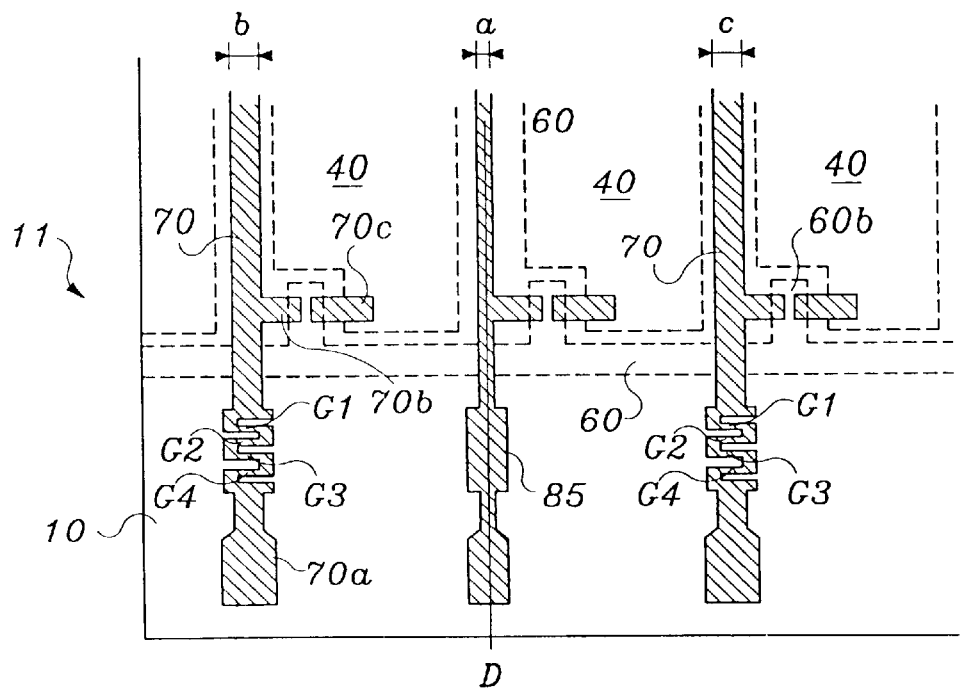

FIG. 4 i a plan view showing a conventional LCD apparatus in which a line of a substrate is formed using a divided exposure method;

FIG. 5 is a plan view showing a conventional LCD apparatus in which a line of a substrate is formed using a divided exposure method;

FIG. 6 is a line pattern of a preferred embodiment of the present invention in which a stitching defect correcting element is defined;

FIG. 7 is a plan view showing a resistance pattern having a wave shape of a stitching defect correcting element according to a preferred embodiment of the present invention; and FIG. 8 is a plan view showing a resistance pattern having a wave shape of a stitching defect correcting element according to a preferred embodiment of the present invention.

DETAILED DESCRIPTION OF PREFERRED EMBODIMENTS

In preferred embodiments of the present invention, a liquid crystal display device includes a stitching defect correcting element defined on at least one of the plurality of data bus lines or on at least one of the plurality of gate bus lines. The stitching defect correcting element includes a resistance changing element that has an increased thickness relative to the data bus line or the gate bus line. The resistance of the stitching defect correcting element can be changed or controlled by patterning it to define a wave shaped pattern in the stitching defect correcting element. The location of the stitching defect correcting element on the data line or the gate line is between an end of the respective line and the pad.

In another preferred embodiment of the present invention, a method of manufacturing the LCD structure as described above includes the steps of forming a TFT array structure in which at least one stitching defect correcting element is formed in between the plurality of the data bus line and the data pads and/or in between the plurality of the gate bus lines and the gate pads, and patterning the stitching defect correcting element to have wave shaped pattern using a laser. A more detailed description of the LCD apparatus and the method of manufacturing the same will be given by reference to the drawings hereinafter.

Referring to FIG. 6, the TFT array substrate according to one embodiment of the present invention is formed such that a first metal layer is patterned using a divided exposure method whereby a stitching defect correcting element 85 is defined at a lower end of the gate pad 60a and the gate bus line 60 is defined at an end of the stitching defect correcting element 85. After applying an insulating layer 65 to prevent conduction with the patterned gate bus line 60, a second metal layer which is formed on the insulating layer with the divided exposure method is patterned so that the stitching defect correcting element 85 is at a lower end of the data pad 70a. The gate bus line 60 and the data bus line 70 are described as if there is only one of each, however, a plurality of gate bus lines 60 are formed parallel to each other and a plurality of data bus lines 70 are formed to be parallel to each other and the gate bus lines 60 and the data bus lines 70 intersect each other.

The stitching defect correcting element 85 does not need to be formed at each of the gate bus lines 60 or at each of the data bus lines 70. It is sufficient to form the stitching defect correcting element only at one data bus line or one gate line disposed at the border part of the divided exposure, or to form a stitching defect correcting element at the data bus lines or gate bus lines which are within a certain area located to the left and right of the border part of the dividing exposure.

After the LCD apparatus is formed using the divided exposure method as described above, an electromagnetic sensor is used to sense the luminance of each pixel electrode to check for the stitching defect. The sensor senses each pixel electrode to determine the charge therein to determine any differences in luminance of the various pixel electrodes.

In the TFT array in which at least one stitching defect correcting element is defined at an end of the data bus line or the gate bus line, there is a problem or irregularity in the width pattern of the gate bus line or the data bus line which is formed at the border part of the divided exposure due to an error in locating and aligning the divided exposure mask as previously explained in the background art.

This could be explained with an example of the pattern of the data bus line 70 in two different cases. First referring to FIG. 7, width (a) of the data bus line 70 located at the border part D of the divided exposure is wider than widths (b) and (c) of the data bus lines 70 which are directly adjacent to the dividing line D. Second referring to FIG. 8, width (a) of the data bus line 70 located at the border part D of the divided exposure is narrower than widths (b) and (c) of the data bus lines 70 located directly adjacent to the dividing line D as shown in FIG. 8.

In the first case, the luminance of the pixel electrode connected to the data bus line 70 which has a width (a) is different from the luminance of the pixel electrode connected to the data bus line 70 which has widths (b) and (c) when the luminance of the pixel electrode is checked. The area where this difference in luminance occurs is recognized as the stitching defect. The reason for this stitching defect is the difference in boundary current of the electrical charge of the pixel electrode due to the difference in flow of voltage in the data bus line as the resistance value of the data bus line 70 which has a width (a) is lower than that of the data bus lines 70 which has widths (b) and (c).

In the second case, the situation described above is reversed. In other words, the resistance value of the data bus line 70 having a width (a) is greater than that of the data bus lines 70 which have widths (b) and (c) so, the stitching defect is not avoidable unlike the situation in FIG. 7.

In preferred embodiments of the present invention, the above-described problems of stitching defects caused when using the divided exposure method are solved by adjusting the flow of the resistance value. For example, if the stitching defect occurs in the screen due to the pattern defect of the data bus line which is located at the border part of the divided exposure, a wave shaped pattern is defined such that the recessed portions of the stitching correcting element width is narrower than that of the data bus line. Defining the wave shaped pattern on the stitching defect correcting element changes the resistance value in the data bus line so that the resistance value in the data bus line at the border part of the divided exposure is similar to the resistance value of the adjacent data bus lines.

In the case of FIG. 7 in which the width (a) of the data bus line 70 located at the border part D of the divided exposure is greater than widths (b) and (c) of the data bus lines 70 that are directly adjacent to the dividing line D, the resistance value is adjusted by defining a wave shaped resistance pattern having a width that is narrower than the data bus line at the stitching defect correcting element 85 which is connected to the data bus line.

In the case of FIG. 8 in which the width (a) of the data bus line 70 located at the border part D of the divided exposure is narrower than widths (b) and (c) of the data bus lines 70 which is formed directly adjacent to the dividing line D, a wave shaped resistance pattern is formed to have a width that is narrower than the data bus lines at the adjacent stitching defect correcting element 85 of the data bus line 70 having widths (b) and (c).

The wave shaped resistance pattern is formed using a laser by alternatively cutting both ends of the stitching defect correcting element. Because the width of each resistance pattern G1, G2, G3, G4 . . . is narrower and because the number of the resistance patterns increases, the resistance value increases. Thus, by adjusting the number and width of the resistance patterns, the resistance value is adjusted.

Note that a stitching defect correcting element 85 may preferably be formed at an end of the gate pad part 60a or the data pad part 70a according to one preferred embodiment of the present invention. Because the stitching defect correcting element is formed by a pattern defining the stitching defect correcting element at the divided exposure mask, the stitching defect correcting element is patterned at the same time that the data bus line or the gate bus line is patterned. The stitching defect correcting element does not need to be formed at all of the gate bus lines or at all of the data bus lines. Forming the stitching defect correcting element at the data bus lines or gate bus lines which are within a certain area to the left and right of the border part of the divided exposure is sufficient to achieve the advantages of the present invention and to eliminate stitching defects.

The advantages achieved by the present invention include eliminating stitching defects easily by forming resistance pattern G1, G2, G3, G4 by alternatively cutting both ends of at least one stitching defect correcting element formed at an end of at least one of the data bus lines 70 or at least one of the gate bus lines 60 and which is connected to the gate bus line and the data bus line located new the border part. In addition, by fixing the stitching defect easily there is an advantage of increasing the production yield.

Although the present invention has been explained with reference to preferred embodiments shown in the drawings described above, it should be understood by the ordinary skilled person in the art that the invention is not limited to the above-described preferred embodiments, but rather that various changes or modifications thereof are possible without departing from the spirit of the invention. Accordingly, the scope of the invention shall be determined only by the appended claims and their equivalents.

What is claimed is:

1. A liquid crystal display apparatus comprising:
   a substrate;
   a plurality of gate lines disposed on the substrate;
   a plurality of data lines disposed with the plurality of gate lines;
   a plurality of data lines disposed on the substrate and arranged to define a matrix pattern with the plurality of gate lines;
   a plurality of thin film transistors connected to the gate lines and data lines;
   a plurality of pixel electrodes connected to the thin film transistors; and
   at least one stitching defect correction element included in at least one of the plurality of data lines or in at least one of the plurality of gate lines, wherein one of the data lines is located along a dividing line of a divided exposure produced by a divided exposure process used for forming the matrix pattern of gate lines and data lines.

2. The liquid crystal display apparatus according to claim 1, wherein the at least one stitching defect correction element comprises a resistance changing element.

3. The liquid crystal display apparatus according to claim 1, wherein the at least one stitching defect correction element comprises an increased thickness portion of the data line.

4. The liquid crystal display apparatus according to claim 1, wherein the at least one stitching defect correction element comprises a wave-shaped pattern disposed along the data line.

5. The liquid crystal display apparatus according to claim 1, wherein the stitching defect correction element is included in at least two of the plurality of data lines.

6. The liquid crystal display apparatus according to claim 1, wherein at least two stitching defect correction elements are provided at two of the data lines located on opposite sides of the dividing line of the divided exposure.

7. The liquid crystal display apparatus according to claim 1, wherein the data line having the stitching defect correc- 7. tion element is the one of the data lines located along the dividing line of the divided exposure.

8. The liquid crystal display apparatus according to claim 1, wherein a stitching defect correction element is included in at least four of the data lines.

9. The liquid crystal display apparatus according to claim 1, wherein one of the data lines is thicker than others of the data lines, and the one of the data lines that is thicker includes the stitching defect correction element.

10. The liquid crystal display apparatus according to claim 1, wherein the location of the stitching defect correction element is between an end of the data line and a data pad.

11. The liquid crystal display apparatus according to claim 1, wherein the location of the stitching defect correction element is between the end of the gate line and a gate pad.

12. A liquid crystal display apparatus according to claim 1, wherein the at least one stitching defect correction element has a wave shaped pattern with a width narrower than the width of the data line located at the dividing line of a divided exposure.

13. A liquid crystal display apparatus according to claim 1, wherein the at least one stitching defect correction element has a wave shaped pattern with a width narrower than the width of the data line located within an area to the right and left of the dividing line of the divided exposure.

14. A liquid crystal display apparatus according to claim 1, wherein the at least one stitching defect correcting element has a wave shaped pattern defined by recesses in the at least one stitching defect correcting element.

15. A method of manufacturing a liquid crystal display apparatus, comprising the steps of:
    providing a substrate; and
    forming a plurality of gate lines and data lines on the substrate such that the gate lines and data lines intersect to define a matrix pattern, the step of forming the plurality of gate lines and data lines including the step of forming at least one stitching defect correcting element along one of the data lines or the gate lines, wherein one of the data lines is located along a dividing line of a divided exposure produced by a divided exposure process used for forming the matrix pattern of gate lines and data lines.

16. The method according to claim 15, wherein the step of forming the at least one stitching defect correcting element includes forming an increased thickness portion along the one of the data lines or gate lines.

17. The method according to claim 16, further comprising the step of patterning the at least one stitching defect correcting element to form recesses in the increased thickness portion.

18. The method according to claim 16, further comprising the step of patterning the at least one stitching defect correcting element to form a wave shaped pattern therein.

19. The method according to claim 16, further comprising the step of patterning the at least one stitching defect correcting element by cutting the at least one stitching defect correcting element using a laser.

20. The method according to claim 16, further comprising the step of patterning the at least one stitching defect correcting element at the same time that the data lines or the gate lines are patterned.

21. The method according to claim 16, further comprising the step of forming a plurality of stitching defect correcting elements along the data lines or the gate lines.

22. The method according to claim 15, wherein the at least one stitching defect correction element comprises a resistance changing element.

23. The method according to claim 15, wherein at least two stitching defect correction elements are formed at two of the data lines located on opposite sides of the dividing line of the divided exposure.

24. The method according to claim 15, wherein the data line having the stitching defect correction element is the one of the data lines located along the dividing line of the divided exposure.

25. The method according to claim 15, wherein one of the data lines is thicker than others of the data lines, and the one of the data lines that is thicker includes the stitching defect correction element.

26. The method according to claim 15, wherein the location of the stitching defect correction element is between an end of the data line and a data pad.

27. The method according to claim 15, wherein the at least one stitching defect correction element has a wave shaped pattern with a width narrower than the width of the data line located at the dividing line of the divided exposure.

28. The method according to claim 15, wherein the at least one stitching defect correction element has a wave shaped pattern with a width narrower than the width of the data line located within an area to the right and left of the dividing line of the divided exposure.

29. A liquid crystal display apparatus comprising:
    a substrate;
    a plurality of gate lines disposed on the substrate;
    a plurality of data lines disposed on the substrate and arranged to define a matrix pattern with the plurality of gate lines;
    a plurality of thin film transistors connected to the gate lines and data lines;
    a plurality of pixel electrodes connected to the thin film transistors; and
    at least one stitching defect correction element included in at least one of the plurality of data lines or in at least one of the plurality of gate lines, wherein the at least one stitching defect correction element comprises a wave-shaped pattern disposed along the data line.

30. A liquid crystal display apparatus comprising:
    a substrate;
    a plurality of gate lines disposed on the substrate;
    a plurality of data lines disposed on the substrate and arranged to define a matrix pattern with the plurality of gate lines;
    a plurality of thin film transistors connected to the gate lines and data lines;
    a plurality of pixel electrodes connected to the thin film transistors; and
    at least one stitching defect correction element included in at least one of the plurality of data lines or in at least one of the plurality of gate lines, wherein the location of the stitching defect correction element is between the end of the gate line and gate pad.

31. A method of manufacturing a liquid crystal display apparatus, comprising the steps of:
    providing a substrate;
    forming a plurality of gate lines and data lines on the substrate such that the gate lines and data lines intersect to define a matrix pattern, the step of forming the plurality of gate lines and data lines including the step of forming at least one stitching defect correcting element along one of the data lines or the gate lines; and
    patterning the at least one stitching defect correcting element to form a wave shaped pattern therein.

32. A method of manufacturing a liquid crystal display apparatus, comprising the steps of:

provide a substrate; and forming a plurality of gate lines and data lines on the substrate such that the gate lines and data lines intersect to define a matrix pattern, the step of forming the plurality of gate lines and data lines including the step of forming at least one stitching defect correcting element along one of the data lines or the gate lines, wherein one of the data lines is thicker than others of the data lines, and the one of the data lines that is thicker includes the stitching defect correction element.

\* \* \* \* \*